Figure 1:
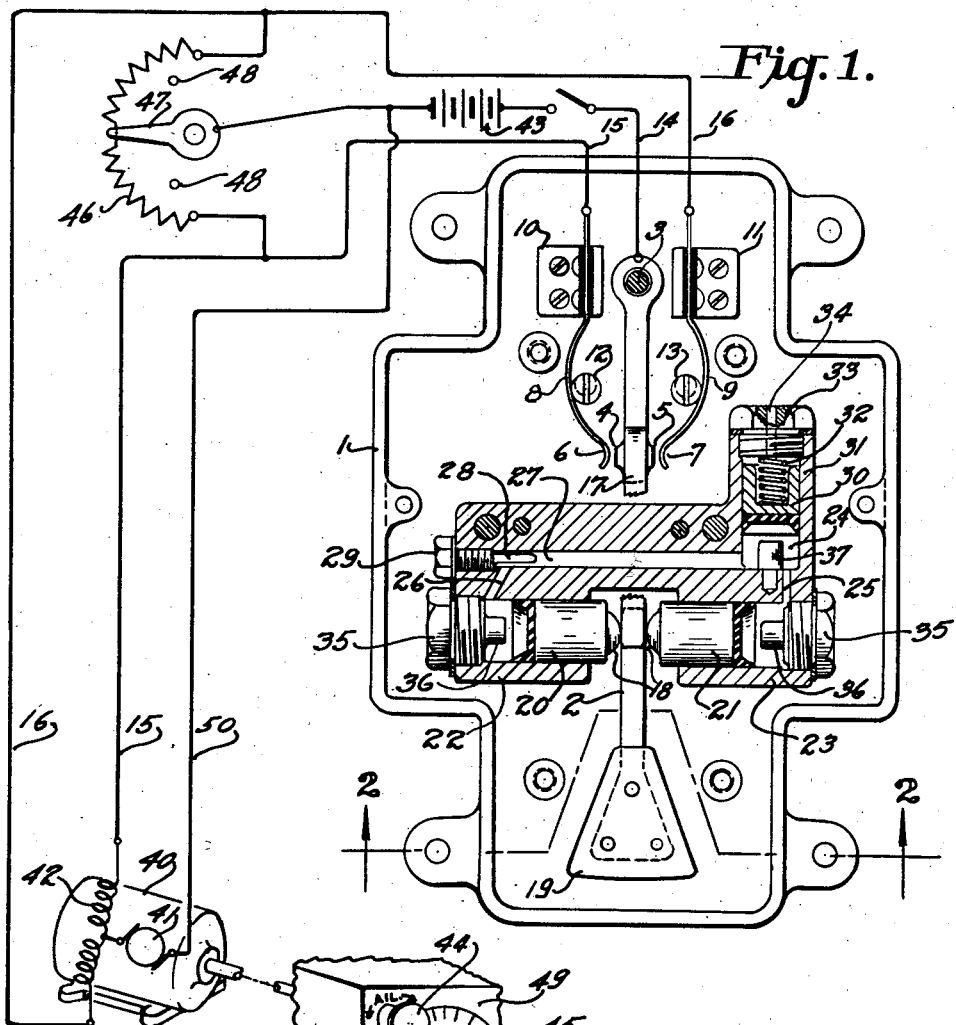

July 30, 1946.   B. G. CARLSON   2,405,015
AUTOMATIC BANK CONTROL
Filed Feb. 4, 1942

INVENTOR.
BERT G. CARLSON.
BY
ATTORNEY.

Patented July 30, 1946

2,405,015

UNITED STATES PATENT OFFICE 2,405,015

AUTOMATIC BANK CONTROL

Bert G. Carlson, Erieside, Ohio, assignor, by mesne assignments, to Jack & Heintz Precision Industries, Inc., Cleveland, Ohio, a corporation of Delaware Application February 4, 1942, Serial No. 429,456

4 Claims. (Cl. 244—77)

This invention relates to the controlling of the lateral stability of an aircraft through an automatic pilot and has particular reference to the maintenance of the proper attitude with respect to the longitudinal axis of the craft in straight forward flight and in turns executed manually through the agency of an automatic pilot.

When flying under the control of an automatic pilot without bank control it is customary to execute turns by rotating the directional control knob associated with the gyro compass, and at the same time operate the banking knob so that the aircraft will be properly banked to negotiate the turn. In some circumstances, as in spiraling to gain altitude, the turning of the aircraft may be caused to continue for a number of complete turns, during all of which time the pilot is required to continuously operate the banking knob in addition to the directional control knob or crank.

The general object of the present invention is to automatically operate the shaft of the banking knob on an automatic pilot so as to maintain the aircraft in the proper attitude with respect to its longitudinal axis at all times in accordance with its speed and turning radius, and to accomplish this without the constant attention or manipulation of the pilot.

A further object is to produce a selected predetermined rate of aileron movement in banking as an aircraft goes into a turn.

A still further object is to produce banking by a selected predetermined rate of aileron movement when an aircraft goes into a turn, and to remove the applied banking at a faster rate whenever the bank is in excess of that required.

A particular object is to provide a method of operating an automatic pilot so as to accomplish the above objects.

A further particular object is to provide an apparatus responsive to the acceleration of gravity and centrifugal force for accomplishing the above stated objects, and for carrying out the method of the invention.

Other objects and advantages of my invention will become apparent from the following description taken in connection with the accompanying drawing, it being clearly understood that the same are by way of illustration and example only, and are not to be taken as in any way limiting the spirit or scope of my invention. The spirit and scope of my invention are to be limited only by the prior art and by the terms of the appended claims.

Figure 2:
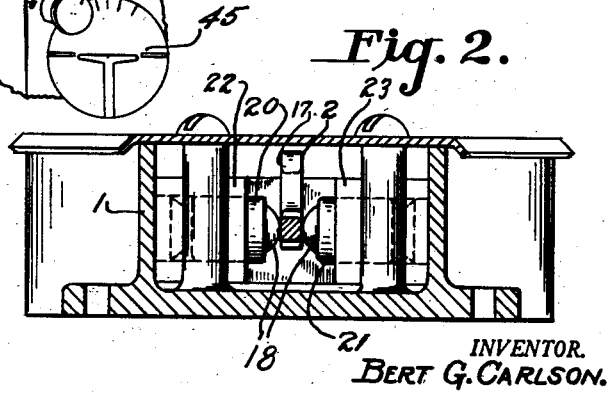

In the drawing, wherein for the purpose of illustration is shown only a preferred embodiment of apparatus for carrying out the invention:

Figure 1 is a schematic representation of the system and apparatus of the present invention, including a vertical sectional view of the acceleration responsive device, and Figure 2 is a sectional view taken on the line 2—2 of Figure 1.

The method of the present invention has its greatest utility in making turns through an automatic pilot of the general type shown in United States Letters Patent No. 1,992,970, issued March 5, 1935, in the name of the present inventor and others. The present method involves banking the aircraft by moving the ailerons at a constant rate as the aircraft goes into the turn, this movement being effected by rotating the banking knob on the automatic pilot at a selected constant speed in the proper direction. Rotation of the banking knob is then maintained at this selected speed until no further angle of bank is required. Whenever the angle of bank is greater than that required at the moment, the banking knob is rotated in the reverse direction at a constant and higher rate of speed. Thus, in coming out of a turn in this manner, the angle of bank is reduced by moving the ailerons in a reverse direction at a constant rate, to return the aircraft to straight line flight.

The method may be carried out without the aid of apparatus by manually rotating the banking knob as described, but the present invention also contemplates the use of novel apparatus for carrying out the method. This apparatus comprises essentially a reversible electric motor for rotating the banking knob at the desired speed in either direction, and an acceleration responsive device to control the electric motor in accordance with the angle of bank required.

The acceleration responsive device is contained within the housing 1. The responsive element is constituted by a pendulum 2 pivoted at 3 on an axis parallel with the longitudinal axis of the aircraft. The pendulum carries contacts 4 and 5 which, upon motion of the pendulum, are adapted to engage complementary contacts 6 and 7. The contacts 6 and 7 are carried on spring members 8 and 9 which are in turn supported upon the brackets 10 and 11 secured to the casing 1. Cam means 12 and 13 are provided for adjusting the spacing of the contacts when the pendulum is hanging in a normal vertical position with respect to the casing 1. Electrical leads 14, 15 and 16 are brought out from the pendulum and the spring members 8 and 9, respectively, for connection with external parts of the system presently to be described.

Means will now be described for damping the oscillations of the pendulum. A pair of pistons, 20 and 21, operating in the cylinders 22 and 23 bear at all times at 18, 18 against opposite sides of the pendulum 2 so that all movements of the latter are transmitted to the pistons. Fluid communication between the cylinders 22 and 23 is established by means of the chamber 24 and the interconnecting passages 25, 26 and 27. The only restriction thereby imposed upon the freedom of movement of the pendulum 2 and the pistons 20 and 21 is the fluid friction in the various communicating channels. Consequently, the amount of damping applied to the pendulum may be conveniently controlled by the size of projection 28 on a plug 29, the said projection being arranged to partially obstruct the passage 27 at the juncture of passage 26. A plurality of plugs 29 may be provided, each with a different diameter in the projection 28 and a plug may be selected which gives the proper damping characteristics to the fluid system.

To provide for volumetric changes in the fluid, one wall of the chamber 24 is constituted by a piston 30 slidable in a cylinder 31. Piston 30 is urged downwardly by spring 32 bearing against the plug 33, thereby constituting a resilient wall for the said chamber. The plug 33 contains an air vent 34. The outer ends of cylinders 22 and 23 are closed by the plugs 35 having projections 36 to act as stops to limit the movement of the pistons 20 and 21 and a similar stop 37 may be provided to limit the movement of piston 30.

In the present embodiment, the shank of the pendulum 2 is offset at 17 around certain parts of the hydraulic damping mechanism just described so that the pivot support 3, contacts 4 and 5, points of contact 18 with the pistons 20 and 21, and the weight 19 are all disposed in substantially a vertical line when the pendulum is hanging vertically. The relationship of certain of these parts is better shown in Figure 2. Any other suitable disposition of the parts may be made to provide clearance for the oscillations of the pendulum.

The electrical leads 14, 15 and 16 complete circuits to a reversible electric motor 40. The motor 40 is preferably of a conventional direct current type having an armature 41 and a two part field winding 42. The connections are such that the circuit 50 from the battery 43 through the armature 41 may be completed through either part of the field winding 42, depending upon which of the leads 15 or 16 is energized by the shifting of the pendulum 2, to produce rotation in opposite directions. When the pendulum is hanging in a neutral position as shown, the battery circuit will be open and the motor 40 will remain inoperative. The motor 40 is arranged to rotate the shaft of banking knob 44 customarily located adjacent the conventional artificial horizon or bank indicator 45 on a panel 49 of a conventional automatic pilot. The manner in which the banking knob adjusts the follow-up to control the position of the ailerons forms no part of the present invention, reference being made to the aforementioned Patent No. 1,992,970 for a disclosure of a typical automatic pilot to which the present invention may be applied.

In the present embodiment, a potentiometer 46 is provided for differentially controlling the speeds of rotation of banking knob 44 in the two directions. By means of the sliding contact 47 the motor 40 may be adjusted to give the desired rate of banking. With the slider 47 in the central position shown, the motor 40 will run at the same speed in either direction, but if the slider 47 is shifted to one side, the motor will run faster in one direction and slower in the other direction. In this way, the potentiometer may be set to produce banking at a selected rate and to reduce the angle of bank at a greater rate in accordance with the demands of the acceleration responsive device. This speed differential between banking and unbanking operations inherently stabilizes the system, tending to reduce overshooting and hunting. It is of course understood that the potentiometer arm 47 may be set prior to making a turn and that it will require no further attention to complete the turn. Stops 48 are provided so that the ends of the potentiometer may act as current limiting resistances always in circuit with the battery. Alternatively, a separate current limiting resistance, or resistances, may be provided in the circuits, as desired, so that the whole length of the potentiometer resistance 46 may be traversed by the slider 47.

It is also to be understood that in lieu of the potentiometer 46 other known speed control means may be employed for the motor 40, such as, for instance, a separate rheostat in each of the lines 15 and 16. If such separate rheostats are used they may be arranged for independent operation or else they may be mechanically connected together for either similar or differential speed adjustment in the two directions of rotation.

By means of the apparatus herein disclosed, the method of the present invention may be practiced when flying with an automatic pilot so that the aircraft will be automatically banked in turns without the attention of the pilot to this detail. The pilot is thereby left free to operate the directional control and perform other duties while the banking of the plane will be automatically taken care of, regardless of the nature or duration of the turn involved. By determining the optimum amount of freedom of movement of the pendulum 2 before making contact at 6 or 7, and making the corresponding adjustments at 12 and 13, and providing the proper size plug 29 in the damping mechanism, the apparatus will function smoothly to operate the ailerons for the proper angle of bank throughout the turn. The banking may be accomplished at either a fast rate or a slow rate as selected by the pilot. Even in a high rate of bank, jerky control is effectively avoided by virtue of the fact that as the speed of the motor 40 is increased in one direction, it is correspondingly decreased in the reverse direction, thereby attenuating the contradictory control effects exerted by the pendulum in its relative movements between the contacts 6 and 7.

The system and apparatus of the present invention also have a particular utility in maintaining the aircraft level laterally in straight forward flight, which may be considered as the special case of zero angle of bank in a turn of infinite or very long radius. Whereas in a turn the pendulum 2 may be said to tend to assume an inclination corresponding to the virtual vertical, in straight forward flight free of lateral accelerations the pendulum will indicate the true vertical and will operate the motor 40 as required to adjust the ailerons so as to maintain the aircraft level laterally. The automatic pilot itself is theoretically operable to hold the craft level laterally, but its operation departs from the theory because of the false assumption that an aircraft is a perfectly rigid structure of unvarying dimensions. It is found in practice that changes in temperature, changes in loading, and the like, in large aircraft are effective to appreciably disturb the tensions and lengths of the control cables with respect to the structure of the aircraft. Such variations are transmitted back to the follow-up mechanism on the gyro controls so as to affect the attitude of the craft. Thus the dimensional variations in long structural and control members of dissimilar materials subjected to temperature changes of considerable degree, and deflections of the wings and fuselage of a large airplane upon release or shifting of the load, may, for instance, slightly shift the air ports in the gyro aileron control in such a manner as to cause the airplane to fly with one wing low. The effect is the same as if the aileron control knob 44 were rotated out of its set position, the plane thereafter tending to continue in its new attitude with one wing down until this condition comes to the attention of the pilot and is corrected by manual rotation of the control knob. In the present invention the pendulum 2 operates continuously to correct any such condition without requiring the attention of the pilot.

While I have shown and described but a single embodiment of my invention, it is to be understood that it is capable of many modifications. Further changes, therefore, in the construction and arrangement may be made which do not depart from the spirit and scope of the invention as defined in the appended claims.

I claim:

1. A bank control for an automatic pilot on an aircraft having a rotatable follow-up adjusting member for establishing the attitude of the aircraft about its longitudinal axis in flight, comprising a pendulum pivoted on an axis parallel to the longitudinal axis of said aircraft, means for damping the movements of said pendulum, a reversible motor connected with said follow-up member for rotating same, means operable by movements of said pendulum for causing said motor to rotate in one direction or the other according to the response of said pendulum to banking and turning movements of said aircraft, and variable means under the control of the operator for causing said motor to rotate at different speeds in different directions of rotation to impart different rates of movement to the ailerons when moving toward and away from their neutral positions, said variable means being optional and selective by the operator for adjustment by a single setting to any selected rate differential to obtain the greatest stability of the aircraft under different flying conditions.

2. A bank control for an automatic pilot on an aircraft having a rotatable follow-up adjusting member for establishing the attitude of the aircraft about its longitudinal axis in flight, comprising a pendulum pivoted for transverse movement with respect to the longitudinal axis of the aircraft, a reversible motor connected with said follow-up member, a source of power for rotating said motor, means operated by movements of said pendulum in response to turning and banking movements of the aircraft to control the application of power from said source to said motor to cause it to turn in one direction or the other when the pendulum is away from neutral position and to remain stationary when the pendulum is in neutral position, and progressively variable manipulatable means available to the operator for further controlling the power supply for said motor to produce by a single setting a selected speed differential of operation thereof in different directions of rotation to produce aileron movement at one speed in one direction and at a different speed in the other direction in effecting roll of the aircraft.

3. A bank control for an automatic pilot on an aircraft having a rotatable follow-up adjusting member for establishing the attitude of the aircraft about its longitudinal axis in flight, comprising a pendulum supported for pivotal movements transverse to the longitudinal axis of the aircraft, a reversible electric motor connected with said follow-up member for rotating same in opposite directions, a power supply for energizing said motor, contacts associated with said pendulum to disconnect said power supply to cause said motor to remain stationary when said pendulum is in neutral position and to energize said motor from said power supply for rotation in opposite directions when said pendulum moves away from said neutral position in one direction or the other in response to turning and banking movements of the aircraft, and a potentiometer under the control of the operator for selectively adjusting by a single setting the relative speeds of the motor in opposite directions to provide for aileron movements at one speed in one direction and at a different speed in the other direction in effecting roll of the aircraft.

4. A bank control for an automatic pilot on an aircraft having a rotatable follow-up adjusting member for establishing the attitude of the aircraft about its longitudinal axis in flight, comprising a pendulum pivoted for movement transverse to said longitudinal axis for response to turning and banking movements of the aircraft, a pair of free pistons engaging opposite sides of said pendulum, a restricted hydraulic circuit associated with said free pistons for damping movements of the pendulum, adjustable contacts on opposite sides of said pendulum arranged to close separate circuits alternatively upon movements of the pendulum away from a neutral position and to open said circuits in the neutral position, a reversible electric motor in driving engagement with said follow-up member, the energization of said motor being controlled by said contacts through said circuits for rotation in opposite directions under the control of pendulum response to turning and banking movements of the aircraft and progressively variable control means accessible to the operator and interconnected with said motor circuits for differentially controlling by a single setting the speed of rotation of the motor in opposite directions to cause aileron movement at one speed in one direction and at a different speed in the other direction in effecting roll of the aircraft.

BERT G. CARLSON.